(12) United States Patent
Kusano

(10) Patent No.: US 10,689,574 B2
(45) Date of Patent: Jun. 23, 2020

(54) CHOLESTERIC RESIN LAMINATE, PRODUCTION METHOD, AND USE

(71) Applicant: ZEON CORPORATION, Chiyoda-ku, Tokyo (JP)

(72) Inventor: Kenji Kusano, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 69 days.

(21) Appl. No.: 15/744,915

(22) PCT Filed: Jul. 27, 2016

(86) PCT No.: PCT/JP2016/072082
§ 371 (c)(1),
(2) Date: Jan. 15, 2018

(87) PCT Pub. No.: WO2017/018468
PCT Pub. Date: Feb. 2, 2017

(65) Prior Publication Data
US 2018/0237695 A1   Aug. 23, 2018

(30) Foreign Application Priority Data
Jul. 28, 2015   (JP) ................................. 2015-148245

(51) Int. Cl.
| C09K 19/24 | (2006.01) |
| C09K 19/12 | (2006.01) |
| C09K 19/20 | (2006.01) |
| B32B 27/00 | (2006.01) |
| G02B 5/26 | (2006.01) |
| B32B 7/12 | (2006.01) |
| B32B 23/20 | (2006.01) |
| G02B 1/08 | (2006.01) |
| G02B 5/08 | (2006.01) |
| G03H 1/00 | (2006.01) |
| C09K 19/04 | (2006.01) |

(52) U.S. Cl.
CPC ............... *C09K 19/24* (2013.01); *B32B 7/12* (2013.01); *B32B 23/20* (2013.01); *B32B 27/00* (2013.01); *C09K 19/12* (2013.01); *C09K 19/20* (2013.01); *C09K 19/2021* (2013.01); *G02B 1/08* (2013.01); *G02B 5/0841* (2013.01); *G02B 5/26* (2013.01); *G03H 1/0011* (2013.01); *B32B 2255/26* (2013.01); *B32B 2451/00* (2013.01); *C09K 2019/0437* (2013.01); *C09K 2019/0448* (2013.01); *C09K 2019/122* (2013.01); *C09K 2219/03* (2013.01); *G03H 2270/11* (2013.01); *G03H 2270/55* (2013.01)

(58) Field of Classification Search
None
See application file for complete search history.

(56) References Cited

U.S. PATENT DOCUMENTS

| 6,180,028 | B1 | 1/2001 | Hotaka et al. |
| 6,217,792 | B1 | 4/2001 | Parri et al. |
| 6,468,444 | B1 | 10/2002 | Meyer et al. |
| 6,879,362 | B2 | 4/2005 | Kawabata |
| 2012/0202084 | A1 | 8/2012 | Tamura |
| 2012/0327318 | A1 | 12/2012 | Tamura |
| 2014/0340740 | A1* | 11/2014 | Saito ............... G02B 5/26 359/359 |

FOREIGN PATENT DOCUMENTS

| JP | H0672962 A | 3/1994 |
| JP | H11100575 A | 4/1999 |
| JP | 2000290315 A | 10/2000 |
| JP | 2003066214 A | 3/2003 |
| JP | 2003313187 A | 11/2003 |
| JP | 2003342219 A | 12/2003 |
| JP | 2004115414 A | 4/2004 |
| JP | 2005289881 A | 10/2005 |
| JP | 2006227360 A | 8/2006 |
| JP | 2007176870 A | 7/2007 |
| JP | 2009104065 A | 5/2009 |
| JP | 2010111104 A | 5/2010 |
| JP | 2013158970 A | 8/2013 |
| JP | 2014141057 A | 8/2014 |
| JP | 2015105962 A | 6/2015 |
| JP | 2015116509 A | 6/2015 |
| TW | 200935101 A | 8/2009 |
| WO | 9800428 A1 | 1/1998 |
| WO | 2009041512 A1 | 4/2009 |
| WO | 2009081735 A1 | 7/2009 |
| WO | 2011007796 A1 | 1/2011 |
| WO | 2011058904 A1 | 5/2011 |

OTHER PUBLICATIONS

Oct. 4, 2016, International Search Report issued in the International Patent Application No. PCT/JP2016/072082.
Jan. 30, 2018, International Preliminary Report on Patentability issued in the International Patent Application No. PCT/JP2016/072082.
Feb. 25, 2019, the Extended European Search Report issued by the European Patent Office in the corresponding European Patent Application No. 16830573.8.

* cited by examiner

*Primary Examiner* — Robert T Butcher
(74) *Attorney, Agent, or Firm* — Kenja IP Law PC

(57) ABSTRACT

A cholesteric resin layered body including a substrate, an intermediate layer, and a cholesteric resin layer in this order, wherein a difference in a reflection band center wavelength of the cholesteric resin layer before and after the layered body is heated at 130° C. for 8 hours is 50 nm or less, method for producing the same, as well as a reflective material, a display medium and a decorating material including the same.

15 Claims, 4 Drawing Sheets

CHOLESTERIC RESIN LAMINATE, PRODUCTION METHOD, AND USE

FIELD

The present invention relates to a cholesteric resin layered body, a production method thereof, and use thereof.

BACKGROUND

There has been known a technology of using a composition capable of exhibiting a cholesteric liquid crystal phase to obtain a layer of a solid resin having cholesteric regularity, that is, a cholesteric resin layer. As the method for producing the cholesteric resin layer, there has been known a method of: preparing a liquid crystal composition being in a liquid state and containing a liquid crystal compound capable of exhibiting a cholesteric liquid crystal phase; applying such a liquid crystal composition onto an appropriate support body to form a layer of the liquid crystal composition; orienting the liquid crystal compound in the liquid crystal composition such that a cholesteric liquid crystal phase is exhibited; and curing the liquid crystal composition while keeping the state of maintaining such orientation.

Properties of reflecting light having a specific wavelength and polarization state can be imparted to a cholesteric resin layer. Taking advantage of such optical properties, the cholesteric resin layer is used in optical devices such as display devices. Taking advantage of such optical properties and design characteristics such as color and gloss attributable to the optical properties, the cholesteric resin layer is used in various use applications such as reflective materials, anthenticity identification display media, and decorating materials (for example, Patent Literature 1).

CITATION LIST

Patent Literature

Patent Literature 1: Japanese Patent Application Laid-Open No. 2013-158970 A

SUMMARY

Technical Problem

However, when a cholesteric resin layer is used in such various use applications, time-dependent change in color during use sometimes becomes a problem.

Therefore, an object of the present invention is to provide a cholesteric resin layered body whose time-dependent change in color during use is reduced, and a method for producing the cholesteric resin layered body, as well as a reflective material, a display medium, and a decorating material including the cholesteric resin layered body whose time-dependent change in color during use is reduced.

Solution to Problem

The present inventor conducted research for solving the aforementioned problem. As a result, the inventor has found that when a cholesteric resin layered body has a specific structure including an intermediate layer, and the change of a reflection band center wavelength does not exceed a specific value, the problem can be solved. Thus, the present invention has been achieved.

That is, according to the present invention, the following <1> to <11> are provided.

(1) A cholesteric resin layered body comprising a substrate, an intermediate layer, and a cholesteric resin layer in this order, wherein
a difference in a reflection band center wavelength of the cholesteric resin layer before and after the layered body is heated at 130° C. for 8 hours is 50 nm or less.

(2) The cholesteric resin layered body according to (1), wherein the cholesteric resin layer reflects light of a band that is a part or an entirety of a visible light wavelength region.

(3) The cholesteric resin layered body according to (1) or (2), wherein the cholesteric resin layer is a layer of a compound having a crosslinked structure.

(4) The cholesteric resin layered body according to any one of (1) to (3), wherein the cholesteric resin layer is formed from a liquid crystal composition containing a compound represented by formula (2):

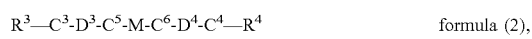

$$R^3-C^3-D^3-C^5-M-C^6-D^4-C^4-R^4 \qquad \text{formula (2),}$$

in the formula (2), $R^3$ and $R^4$ each independently represent a group selected from the group consisting of a (meth)acryl group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group, $D^3$ and $D^4$ each independently represent a group selected from the group consisting of a single bond, a linear or branched alkyl group of 1 to 20 carbon atoms, and a linear or branched alkylene oxide group of 1 to 20 carbon atoms, $C^3$ to $C^6$ each independently represent a group selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—, M represents a group in which two to four skeletons being the same as or different from each other are linked via a linking group, the skeleton being selected from the group consisting of azomethines, azoxys, phenyls, biphenyls, terphenyls, naphthalenes, anthracenes, benzoic acid esters, cyclohexanecarboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexyl benzonitriles which are unsubstituted or may have a substituent, and the linking group being selected from the group consisting of —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—, the substituent that M may have is a halogen atom, an alkyl group of 1 to 10 carbon atoms that may have a substituent, a cyano group, a nitro group, —O—$R^5$, —O—C(=O)—$R^5$, —C(=O)—O—$R^5$, —O—C(=O)—O—$R^5$, —NR$^5$—C(=O)—$R^5$, —C(=O)—NR$^5$R$^7$, or —O—C(=O)—NR$^5$R$^7$, wherein $R^5$ and $R^7$ represent a hydrogen atom or an alkyl group of 1 to 10 carbon atoms, wherein when $R^5$ and $R^7$ are an alkyl group, —O—, —S—, —O—C(=O)—, —C(=O)—O—, —O—C(=O)—O—, —NR$^6$—C(=O)—, —C(=O)—NR$^6$—, —NR$^6$—, or —C(=O)— may be interposed in the alkyl group (with a proviso that cases where two or more adjacent —O—'s and two or more adjacent —S—'s are interposed are excluded), wherein $R^6$ represents a hydrogen atom or an alkyl group of 1 to 6 carbon atoms, and the substituent in the alkyl group of 1 to 10 carbon atoms that may have a substituent is a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, or an alkoxycarbonyloxy group of 2 to 7 carbon atoms.

(5) The cholesteric resin layered body according to any one of (1) to (4), wherein the substrate is a film of an acetyl cellulose resin or a cycloolefin resin.

(6) The cholesteric resin layered body according to any one of (1) to (5), wherein the intermediate layer is a layer containing polyvinyl alcohol, a modified polyvinyl alcohol compound, or a mixture thereof, or a layer of a cured product of a material containing the polyvinyl alcohol, the modified polyvinyl alcohol compound, or a mixture thereof, and a curing agent.

(7) The cholesteric resin layered body according to (6), wherein the intermediate layer is a layer of a cured product of a material containing the modified polyvinyl alcohol compound and the curing agent.

(8) The cholesteric resin layered body according to any one of (1) to (7), wherein the intermediate layer is an adhesive layer obtained by curing an adhesive agent, and the substrate and the cholesteric resin layer are bonded via the adhesive layer.

(9) A method for producing the cholesteric resin layered body according to any one of (1) to (8), comprising:
stacking the substrate and the cholesteric resin layer via a layer of an adhesive agent; and
curing the layer of the adhesive agent to form the intermediate layer.

(10) The production method according to (9), wherein the adhesive agent is a material containing polyvinyl alcohol, a modified polyvinyl alcohol compound, or a mixture thereof, or a material containing the polyvinyl alcohol, the modified polyvinyl alcohol compound, or a mixture thereof, and a curing agent.

(11) The production method according to (10), wherein the adhesive agent is a material containing the modified polyvinyl alcohol compound and the curing agent.

(12) A reflective material comprising the cholesteric resin layered body according to any one of (1) to (8).

(13) A display medium comprising the cholesteric resin layered body according to any one of (1) to (8).

(14) A decorating material comprising the cholesteric resin layered body according to any one of (1) to (8).

Advantageous Effects of Invention

The cholesteric resin layered body according to the present invention can be a layered body whose time-dependent change in color during use is reduced. Accordingly, the reflective material, the display medium, and the decorating material according to the present invention each including such a cholesteric resin layered body can be those whose time-dependent change in color during use is reduced. According to the method for producing the cholesteric resin layered body of the present invention, such a cholesteric resin layered body according to the present invention can be easily produced.

DESCRIPTION OF EMBODIMENTS

Hereinafter, the present invention will be described in detail with reference to embodiments and examples. However, the present invention is not limited to the embodiments and examples described below, which can be optionally modified for implementation without departing from the scope of claims of the present invention and its equivalents.

As described herein, "(meth)acryl" encompasses both acryl and methacryl, "(meth)acrylate" encompasses both acrylate and methacrylate, "(thio)epoxy" encompasses both epoxy and thioepoxy, and "iso(thio)cyanate" encompasses both isocyanate and isothiocyanate.

[1. Summary of Cholesteric Resin Layered Body]

The cholesteric resin layered body according to the present invention includes a substrate, an intermediate layer, and a cholesteric resin layer in this order.

Figure 1:
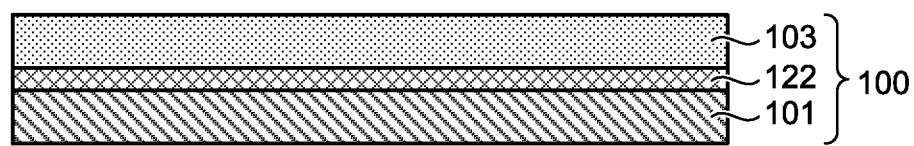
FIG. 1 is a cross-sectional view schematically illustrating an example of a cholesteric resin layered body according to the present invention.

FIG. 1 is a cross-sectional view schematically illustrating an example of the cholesteric resin layered body according to the present invention. In FIG. 1, a cholesteric resin layered body 100 includes a substrate 101, a cholesteric resin layer 103, and an intermediate layer 122 inteposed between the substrate 101 and the cholesteric resin layer 103.

[2. Substrate]

The material constituting the substrate is not particularly limited. Examples of the material may include resin, metal, glass, and paper.

When the substrate is positioned closer to a viewer side than the cholesteric resin layer in an aspect of use of the cholesteric resin layered body, an optically transparent material is preferably used. The optically transparent material is preferably a material with which the total light transmittance of the substrate becomes 70% or more.

When the substrate is positioned closer to a viewer side than the cholesteric resin layer, and a circularly polarized light component to be reflected in the cholesteric resin layer is used, in an aspect of use of the cholesteric resin layered body, a material with which the degree of change in polarization of light passing through the substrate is reduced may be preferably used as a material constituting the substrate. Preferable examples of such a material may include an acetyl cellulose resin and a cycloolefin resin. From the viewpoint of purchasing costs and an affinity to the intermediate layer, an acetyl cellulose resin is more preferable. A more specific example of the acetyl cellulose resin may be a triacetyl cellulose resin.

In the example illustrated in FIG. 1, the substrate 101 is a single layer formed of a single material. However, the substrate according to the present invention is not limited to this, and may include a plurality of layers. In such a case, materials constituting the plurality of layers may be the same as or different from each other. However, from the viewpoint of easiness of production, a single layer is preferable.

The thickness of the substrate is not particularly limited, and may be appropriately set depending on the use application of the cholesteric resin layered body. The thickness of the substrate is preferably 0.1 μm or more, and more preferably 0.3 μm or more, and is preferably 2000 μm or less, and more preferably 1000 μm or less.

Examples of the method for molding the substrate may include a melt molding method and a solution casting method. Examples of the melt molding method may include a melt extrusion method in which molding is performed by melt extrusion, a press molding method, an inflation molding method, an injection molding method, a blow molding method, and a stretch molding method. Among these methods, a melt extrusion method, an inflation molding method, and a press molding method are preferable from the viewpoint of obtaining a pre-stretch substrate having excellent mechanical strength and surface accuracy. Among these, a melt extrusion method is particularly preferable, because the amount of a remaining solvent can be reduced, and the production can be efficiently and simply performed. As the substrate, a commercially available product may also be appropriately purchased for use.

The surface of the substrate may be subjected to a surface treatment as necessary. For example, the surface of the substrate with which the intermediate layer is brought into contact may be subjected to a treatment such as a saponification treatment and a corona treatment, prior to the formation of the intermediate layer. By such a treatment, for example, an affinity to the intermediate layer can be enhanced.

[3. Cholesteric Resin Layer]

The cholesteric resin layer is a layer of a solid resin having cholesteric regularity. The cholesteric regularity refers to a structure in which angles of molecular axes in stacking planes become skewed (twisted) as the planes are sequentially observed passing through stacked planes, in such a manner that molecular axes in a first plane are aligned in a certain direction, a direction of molecular axes in a subsequent plane stacking thereon is skewed with a small angle with respect to the first plane, and a direction of molecular axes in still subsequent plane is in a further skewed angle. The structure in which the direction of molecular axes is continuously skewed in this manner becomes an optically chiral structure.

The cholesteric resin layer usually has a circularly polarized light separation function. That is, the cholesteric resin layer usually has properties of allowing for transmission of one of clockwise circularly polarized light and counterclockwise circularly polarized light and reflection of a part or an entirety of the other. The reflection in the cholesteric resin layer takes place while retaining chirality of the circularly polarized light.

The wavelength at which the circularly polarized light separation function is exerted depends on the pitch of the helical structure of the cholesteric resin layer. The pitch of the helical structure is a distance in a plane normal line direction, from the start of gradual skewing of the direction of molecular axes with an angle in the helical structure as proceeding through planes, to the return to the original direction of molecular axes. The wavelength at which the circularly polarized light separation function is exerted can be changed by changing the size of the pitch of this helical structure. A circularly polarized light separation function on a wide band can be obtained with a single cholesteric resin layer, by forming a cholesteric resin layer in which the size of the pitch of the helical structure continuously changes in the layer. It is preferable that the cholesteric resin layer has the circularly polarized light separation function for light of a band that is a part or an entirety of a visible light wavelength region, and can selectively reflect circularly polarized light on the band.

The cholesteric resin layer may be formed by applying a layer of a liquid crystal composition on an appropriate support body for forming a resin layer to obtain a layer of the liquid crystal composition, and curing this layer.

[3.1. Liquid Crystal Composition]

The liquid crystal composition is a fluid material containing a liquid crystal compound. Here, the material referred to for the sake of convenience as the "liquid crystal composition" encompasses not only a mixture of two or more substances but also a material including a single substance.

As the liquid crystal compound, a liquid crystal compound having polymerizability is preferable. The liquid crystal composition containing the liquid crystal compound having polymerizability can be easily cured by polymerizing the liquid crystal compound.

As the liquid crystal compound, a cholesteric liquid crystal compound may be used. The cholesteric liquid crystal compound is a compound which can exhibit cholesteric liquid crystalline properties. With the use of the liquid crystal composition containing such a cholesteric liquid crystal compound, the liquid crystal compound exhibits a cholesteric liquid crystal phase in the layer of the liquid crystal composition formed on the surface of the support body. Therefore, a cholesteric resin layer can be produced by curing this layer of the liquid crystal composition. Specifically, a non-liquid crystal cholesteric resin layer cured while retaining a state of exibiting cholesteric regularity can be obtained by polymerizing the liquid crystal compound while keeping a state of exhibiting the cholesteric liquid crystal phase so that the layer of the liquid crystal composition is cured.

Examples of the aforementioned liquid crystal composition for forming the cholesteric resin layer in which the size of the pitch of the helical structure continuously changes may include a liquid crystal composition containing a compound represented by the following formula (1) and a specific rod-like liquid crystal compound. This specific liquid crystal composition may be referred to hereinbelow as a "liquid crystal composition (X)".

$$R^1\text{-}A^1\text{-}B\text{-}A^2\text{-}R^2 \tag{1}$$

In the formula (1), $R^1$ and $R^2$ are each independently a group selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meth)acryl group in which any linking group is optionally interposed, an epoxy group, a mercapto group, an isocyanate group, an amino group, and a cyano group.

The alkyl group and the alkylene oxide group may be unsubstituted or may be substituted with a halogen atom at one or more positions. Furthermore, the halogen atom, the hydroxyl group, the carboxyl group, the (meth)acryl group, the epoxy group, the mercapto group, the isocyanate group, the amino group, and the cyano group may be linked to an alkyl group of 1 to 2 carbon atoms and an alkylene oxide group.

Preferable examples of $R^1$ and $R^2$ may include a halogen atom, a hydroxyl group, a carboxyl group, a (meth)acryl group, an epoxy group, a mercapto group, an isocyanate group, an amino group, and a cyano group.

It is preferable that at least one of $R^1$ and $R^2$ is a reactive group. When a reactive group is contained as at least one of $R^1$ and $R^2$, the compound represented by the aforementioned formula (1) can be fixed in the cholesteric resin layer during curing, to thereby form a further firmer layer. Here, examples of the reactive group may include a carboxyl group, a (meth)acryl group, an epoxy group, a mercapto group, an isocyanate group, and an amino group.

In the formula (1), $A^1$ and $A^2$ each independently represent a group selected from the group consisting of a 1,4-phenylene group, a 1,4-cyclohexylene group, a 1,4-cyclohexenyl group, a 4,4'-biphenylene group, a 4,4'-bicyclohexylene group, and a 2,6-naphthylene group. The 1,4-phenylene group, the 1,4-cyclohexylene group, the 1,4-cyclohexenyl group, the 4,4'-biphenylene group, the 4,4'-bicyclohexylene group, and the 2,6-naphthylene group may be unsubstituted, or may be substituted at one or more positions with a substituent such as a halogen atom, a hydroxyl group, a carboxyl group, a cyano group, an amino group, an alkyl group of 1 to 10 carbon atoms, and an alkyl halide group. When two or more substituents exist in each of $A^1$ and $A^2$, they may be the same as or different from each other.

Particularly preferable examples of $A^1$ and $A^2$ may include a group selected from the group consisting of a 1,4-phenylene group, a 4,4'-biphenylene group, and a 2,6-naphthylene group. An aromatic ring skeleton of these groups is relatively rigid compared to an alicyclic skeleton, and has a high affinity to a mesogen of the rod-like liquid crystal compound. Thus, orientation uniformity is further enhanced.

In the formula (1), B is selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—.

Particularly preferable examples of B may include a single bond, —O—(C=O)—, and —CH=N—N=CH—.

It is preferable that at least one type of the compounds represented by the formula (1) has liquid crystalline properties, and also has chirality. It is also preferable that a plurality of optical isomers are used in combination as the compound represented by the formula (1). For example, there may be used a mixture of a plurality of types of enantiomers, a mixture of a plurality of types of diastereomers, and a mixture of an enantiomer and a diastereomer. It is preferable that the melting point of at least one type of the compounds represented by the formula (1) is in a range of 50° C. to 150° C.

When the compound represented by the formula (1) has liquid crystalline properties, it is preferable that the compound has a high refractive index anisotropy Δn. By using a liquid crystal compound having a high refractive index anisotropy Δn as the compound represented by the formula (1), the refractive index anisotropy Δn of the liquid crystal composition containing such a liquid crystal compound can be enhanced, and a cholesteric resin layer having a wide wavelength range in which circularly polarized light can be reflected can be produced. The refractive index anisotropy Δn of at least one type of the compounds represented by the formula (1) is preferably 0.18 or more, and more preferably 0.22 or more. Although the refractive index anisotropy Δn is preferably as large as possible, it is practically 0.35 or less. Here, the refractive index anisotropy Δn may be measured by a Senarmont method. For example, a layer of a cured resin may be observed for an extinction position (θ) using an optical microscope (ECLIPSE E600POL (transmission and reflection type) equipped with a sensitive color plate, a λ/4 wave plate, a Senarmont compensator, and a GIF filter 546 nm, manufactured by Nikon Corporation) thereby to calculate a retardation (Re) according to the mathematical equation Re=λ(546 nm)×θ/180, and Δn can be calculated according to the mathematical equation Δn=Re/d with a separately obtained thickness (d) of the layer.

Particularly preferable examples of the compound represented by the formula (1) may include the following compounds (A1) to (A9). One type thereof may be solely used, and two or more types thereof may also be used in combination at any ratio.

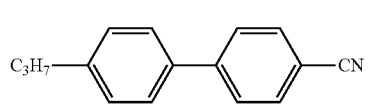

(A1)

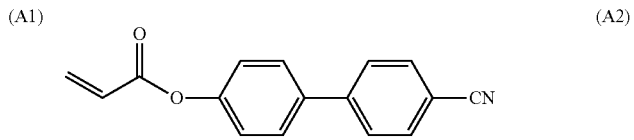

(A2)

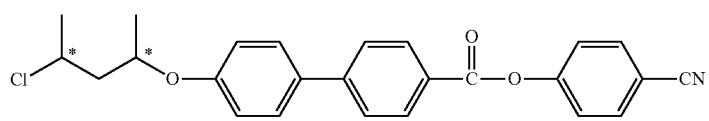

(A3)

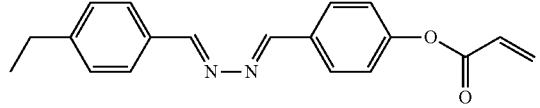

(A4)

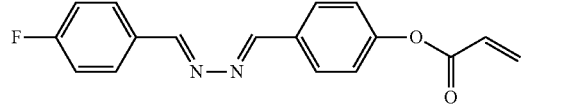

(A5)

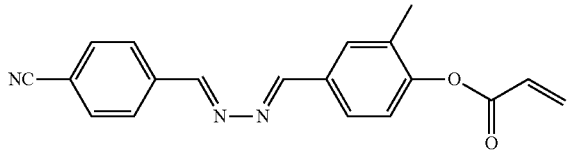

(A6)

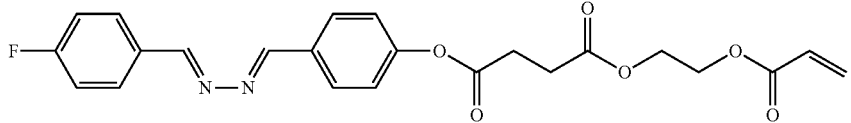

(A7)

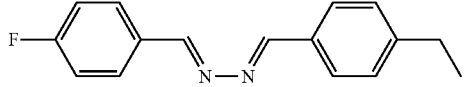

(A8)

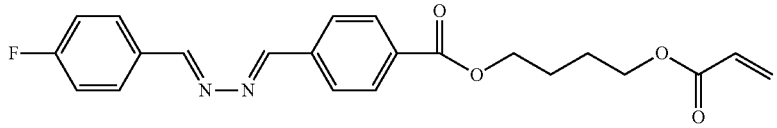

(A9)

In the aforementioned compound (A3), "*" represents a chiral center.

As the liquid crystal compound used in combination with the compound represented by the aforementioned formula (1) in the liquid crystal composition (X), there may be used a rod-like liquid crystal compound having at least two or more reactive groups in one molecule. Examples of this rod-like liquid crystal compound may include a compound represented by the formula (2).

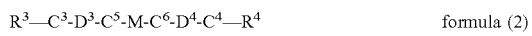

formula (2)

In the formula (2), $R^3$ and $R^4$ are each a reactive group, and each independently represents a group selected from the group consisting of a (meth)acryl group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group. With these reactive groups, a cholesteric resin layer having high strength can be obtained when the liquid crystal composition is cured. For example, in terms of pencil hardness (JIS K5400), there can be usually obtained a cholesteric resin layer of HB or higher, and preferably H or higher. When the strength is enhanced in this manner, tendency to cause scratches on the surface of the cholesteric resin layer can be reduced, and handling properties can thereby be enhanced.

In the formula (2), $D^3$ and $D^4$ each independently represent a group selected from the group consisting of a single bond, a linear or branched alkyl group of 1 to 20 carbon atoms, and a linear or branched alkylene oxide group of 1 to 20 carbon atoms.

In the formula (2), $C^3$ to $C^6$ each independently represent a group selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—.

In the formula (2), M represents a mesogen group. Specifically, M represents a group in which two to four skeletons being the same as or different from each other are linked via a linking group such as —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—, the skeleton being selected from the group consisting of azomethines, azoxys, phenyls, biphenyls, terphenyls, naphthalenes, anthracenes, benzoic acid esters, cyclohexanecarboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexyl benzonitriles which are unsubstituted or may have a substituent.

Examples of the substituent that the mesogen group M may have may include a halogen atom, an alkyl group of 1 to 10 carbon atoms that may have a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, and —O—C(=O)—NR$^5$R$^7$. Here, R$^5$ and R$^7$ each represent a hydrogen atom or an alkyl group of 1 to 10 carbon atoms. When R$^5$ and R$^7$ are an alkyl group, —O—, —S—, —O—C(=O)—, —C(=O)—O—, —O—C(=O)—O—, —NR$^6$—C(=O)—, —C(=O)—NR$^6$—, —NR$^6$—, or —C(=O)— may be interposed in the alkyl group (with a proviso that cases where two or more adjacent —O—'s and two or more adjacent —S—'s are interposed are excluded). Here, R$^6$ represents a hydrogen atom or an alkyl group of 1 to 6 carbon atoms.

Examples of the substituent in the aforementioned "alkyl group of 1 to 10 carbon atoms that may have a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

The aforementioned rod-like liquid crystal compound preferably has an asymmetrical structure. Here, the asymmetrical structure means a structure in which, in the formula (2), R$^3$—C$^3$-D$^3$-C$^5$— and —C$^6$-D$^4$-C$^4$—R$^4$ are different from each other about the centering mesogen group M. When the rod-like liquid crystal compound to be used has an asymmetrical structure, orientation uniformity can be further enhanced.

The refractive index anisotropy Δn of the rod-like liquid crystal compound is preferably 0.18 or more, and more preferably 0.22 or more. Although the refractive index anisotropy Δn is preferably as large as possible, it is practically 0.35 or less. When a rod-like liquid crystal compound having a refractive index anisotropy Δn of 0.30 or more is used, an absorption edge on the long wavelength side of a UV-absorption spectrum of the rod-like liquid crystal compound may reach the visible range. However, such a rod-like liquid crystal compound may be used as long as desired optical performance is not adversely affected even when the spectral absorption edge reaches the visible range. With the use of a rod-like liquid crystal compound having such a high refractive index anisotropy Δn, there can be obtained a cholesteric resin layer having high optical performance (for example, selective reflection performance of circularly polarized light).

Preferable specific examples of the rod-like liquid crystal compound may include the following compounds (B1) to (B9). One type thereof may be solely used, and two or more types thereof may also be used in combination at any ratio.

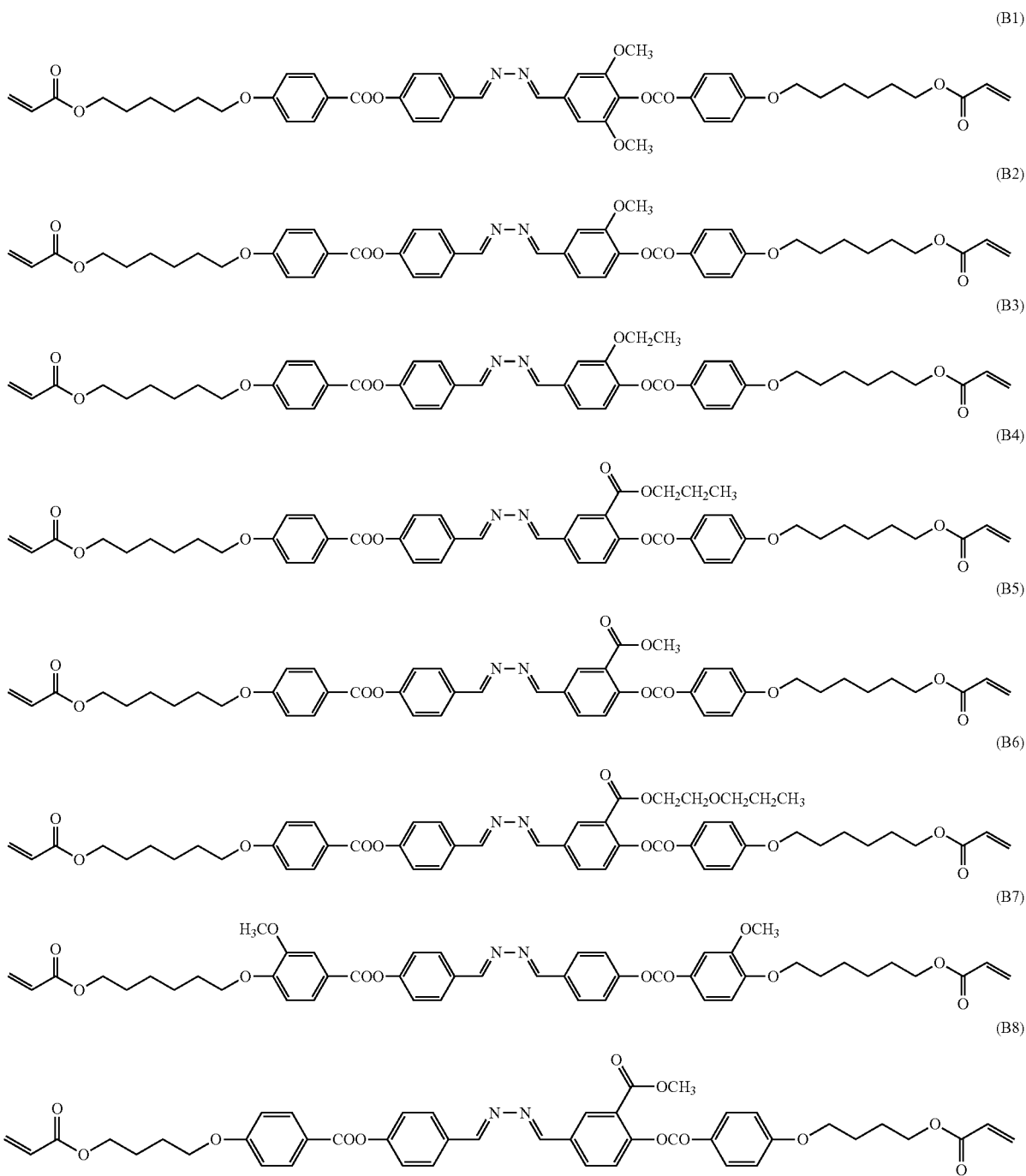

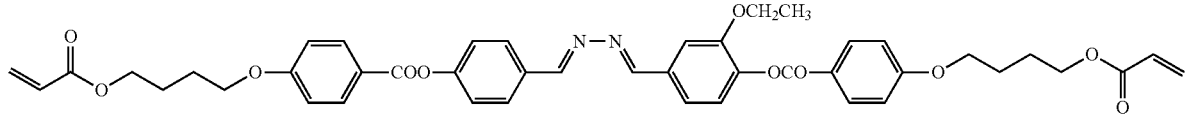

(B9)

The weight ratio expressed by (total weight of the compound represented by the formula (1))/(total weight of the rod-like liquid crystal compound) is preferably 0.05 or more, more preferably 0.1 or more, and particularly preferably 0.15 or more, and is preferably 1 or less, more preferably 0.65 or less, and particularly preferably 0.45 or less. When the weight ratio is equal to or more than the lower limit value of the aforementioned range, orientation uniformity in the layer of the liquid crystal composition can be enhanced. When the weight ratio is equal to or less than the upper limit value, orientation uniformity can be enhanced. In addition, stability of the liquid crystal phase in the liquid crystal composition can be enhanced. Furthermore, since the refractive index anisotropy Δn of the liquid crystal composition can thereby be increased, there can be stably obtained a cholesteric resin layer having desired optical performance such as selective reflection performance of circularly polarized light, for example. Here, when only one type of the compounds represented by the formula (1) is used, the total weight of the compound represented by the formula (1) refers to the weight thereof. When two or more types thereof are used, it refers to a total weight of these compounds. Similarly, when only one type of the rod-like liquid crystal compounds is used, the total weight of the rod-like liquid crystal compound refers to the weight thereof. When two or more types thereof are used, it refers to a total weight of these rod-like liquid crystal compounds.

When the compound represented by the formula (1) and the rod-like liquid crystal compound are used in combination, the molecular weight of the compound represented by the formula (1) is preferably less than 600, and the molecular weight of the rod-like liquid crystal compound is preferably 600 or more. Accordingly, the compound represented by the formula (1) can enter spaces between the rod-like liquid crystal compounds having a molecular weight larger than the compound represented by the formula (1). Therefore, orientation uniformity can be enhanced.

The liquid crystal composition such as the liquid crystal composition (X) may contain a chiral agent. Usually, the twisting direction of the cholesteric resin layer may be appropriately selected by the type and structure of the used chiral agent. Specific examples of the chiral agent to be used may include those described in Japanese Patent Application Laid-Open Nos. 2005-289881 A, 2004-115414 A, 2003-66214 A, 2003-313187 A, 2003-342219 A, 2000-290315 A, and Hei. 6-072962 A, U.S. Pat. No. 6,468,444, International Publication No. 98/00428 A, and Japanese Patent Application Laid-Open No. 2007-176870 A. The chiral agent is available as, for example, Paliocolor LC756 from BASF Co., Ltd. As the chiral agent, one type thereof may be solely used, and two or more types thereof may also be used in combination at any ratio.

The amount of the chiral agent may be set to any amount within the range that does not reduce desired optical performance. The specific amount of the chiral agent in the liquid crystal composition is usually 1% by weight to 60% by weight.

It is preferable that the cholesteric resin layer is a layer of a compound having a crosslinked structure for enhancing mechanical strength and durability. For obtaining such a cholesteric resin layer, the liquid crystal composition such as the liquid crystal composition (X) may contain a crosslinking agent. For example, the crosslinking agent may react during curing of the layer of the liquid crystal composition, a reaction of the crosslinking agent may be promoted through a heat treatment after curing, and a reaction of the crosslinking agent may naturally proceed due to moisture. Consequently, the crosslinking density of the cholesteric resin layer can be increased. As the crosslinking agent, there may be used a crosslinking agent which can react with UV light, heat, moisture, and the like. In particular, a crosslinking agent which does not deteriorate the orientation uniformity of the liquid crystal compound is preferable as the crosslinking agent.

Examples of the crosslinking agent may include: a multifunctional acrylate compound such as trimethylolpropane tri(meth)acrylate, pentaerythritol tri(meth)acrylate, pentaerythritol tetra(meth)acrylate, dipentaerythritol hexa(meth)acrylate, and 2-(2-vinyloxyethoxy)ethyl acrylate; an epoxy compound such as glycidyl (meth)acrylate, ethylene glycol diglycidyl ether, glycerin triglycidyl ether, and pentaerythritol tetraglycidyl ether; an aziridine compound such as 2,2-bishydroxymethylbutanol-tris[3-(l-aziridinyl)propionate], 4,4-bis(ethyleneiminocarbonylamino)diphenylmethane, and trimethylolpropane-tri-β-aziridinylpropionate; an isocyanate compound such as hexamethylene diisocyanate, isocyanurate-type isocyanate derived from hexamethylene diisocyanate, biuret-type isocyanate, and adduct-type isocyanate; a polyoxazoline compound having on its side chain an oxazoline group; and an alkoxysilane compound such as vinyltrimethoxysilane, N-(2-aminoethyl)3-aminopropyltrimethoxysilane, 3-aminopropyltrimethoxysilane, 3-glycidoxypropyltrimethoxysilane, 3-(meth)acryloxypropyltrimethoxysilane, and N-(1,3-dimethylbutylidene)-3-(triethoxysilyl)-1-propaneamine. As the crosslinking agent, one type thereof may be solely used, and two or more types thereof may also be used in combination at any ratio. Furthermore, a known catalyst may be used according to the reactivity of the crosslinking agent. With the use of the catalyst, productivity can be enhanced in addition to the enhancement of the strength and durability of the cholesteric resin layer.

The amount of the crosslinking agent is preferably set such that the amount of the crosslinking agent in the cholesteric resin layer obtained by curing the layer of the liquid crystal composition is 0.1% by weight to 15% by weight. When the amount of the crosslinking agent is equal to or more than the lower limit value of the aforementioned range, the crosslinking density can be efficiently increased. When the amount is equal to or less than the upper limit value, stability of the layer of the liquid crystal composition can be enhanced.

The liquid crystal composition such as the liquid crystal composition (X) may contain a photopolymerization initiator. As the photopolymerization initiator, there may be used, for example, a compound which is capable of generating a radical or an acid with UV light or visible light. Specific examples of the photopolymerization initiator may include benzoin, benzyl methyl ketal, benzophenone, biacetyl, acetophenone, Michler's ketone, benzyl, benzyl isobutyl ether, tetramethylthiuram mono(di)sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, pp'-dichlorobenzophenone, pp'-bis-diethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenyl-phosphine oxide, 2-methyl-1[4-(methylthio)phenyl]-2-morpholinopropane-1-one, 2-benzyl-2-dimethylamino-1-(4-morpholinophenyl)-butane-1-one, anthracene benzophenone, α-chloroanthraquinone, diphenyl disulfide, hexachlorbutadiene, pentachlorbutadiene, octachlorobutene, 1-chlormethyl naphthalene, a carbazole oxime compound such as 1,2-octanedione-1-[4-(phenylthio)-2-(o-benzoyloxime)] and 1-[9-ethyl-6-(2-methylbenzoyl)-9H-carbazole-3-yl]ehanone 1-(o-acetyloxime), (4-methylphenyl) [4-(2-methylpropyl)phenyl]iodonium hexafluorophosphate, 3-methyl-2-butynyltetramethylsulfonium hexafluoroantimonate, and diphenyl-(p-phenylthiophenyl)sulfonium hexafluoroantimonate. One type thereof may be solely used, and two or more types thereof may also be used in combination at any ratio. Furthermore, a tertiary amine compound as a known photosensitizer or polymerization accelerator may be used as necessary to control curing properties.

The amount of the photopolymerization initiator in the liquid crystal composition is preferably 0.03% by weight to 7% by weight. When the amount of the photopolymerization initiator is equal to or more than the lower limit value of the aforementioned range, polymerization degree can be increased. Accordingly, the mechanical strength of the cholesteric resin layer can be enhanced. When the amount is equal to or less than the upper limit value, orientation of the liquid crystal compound can be made favorable. Accordingly, the liquid crystal phase of the liquid crystal composition can be stabilized.

The liquid crystal composition such as the liquid crystal composition (X) may contain a surfactant. As the surfactant, for example, a surfactant which does not impair orientation may be appropriately selected for use. A suitable example of such a surfactant may be a nonionic surfactant containing siloxane or a fluorinated alkyl group in a hydrophobic group portion. In particular, an oligomer having two or more hydrophobic group portions in one molecule is particularly suitable. Specific examples of these surfactants may include PolyFox PF-151N, PF-636, PF-6320, PF-656, PF-6520, PF-3320, PF-651, and PF-652 available from Omnova Solutions Inc.; Futargent FTX-209F, FTX-208G, and FTX-204D available from Neos Corporation; and Surflon KH-40 available from Seimi Chemical Co., Ltd. As the surfactant, one type thereof may be solely used, and two or more types thereof may also be used in combination at any ratio.

The amount of the surfactant is preferably set such that the amount of the surfactant in the cholesteric resin layer is 0.05% by weight to 3% by weight. When the amount of the surfactant is equal to or more than the lower limit value of the aforementioned range, orientation regulating force at the air interface of the liquid crystal composition can be enhanced. Accordingly, orientation defects can be prevented. When the amount is equal to or less than the upper limit value, decrease in orientation uniformity due to an excessive surfactant having entered spaces between liquid crystal molecules can be prevented.

The liquid crystal composition such as the liquid crystal composition (X) may further contain an optional component as necessary. Examples of the optional component may include: a solvent; a polymerization inhibitor for improving pot life; and an antioxidant, a UV light absorber, and a photo-stabilizer for enhancing durability. As the optional component, one type thereof may be solely used, and two or more types thereof may also be used in combination at any ratio. The amounts of these optional components may be set to any amount within a range that does not reduce desired optical performance.

The method for producing the liquid crystal composition used in the present invention is not particularly limited. The liquid crystal composition may be produced by mixing the aforementioned components.

[3.2. Specific Method for Forming Cholesteric Resin Layer]

The cholesteric resin layer may be formed by applying the aforementioned liquid crystal composition such as the liquid crystal composition (X) onto an appropriate support body for forming the cholesteric resin layer to obtain a layer of the liquid crystal composition, and curing this layer.

The support body is not particularly limited, and any monolayer or multilayer film suitable for the implementation of the method may be used. Examples of a material of the support body may include synthetic resins such as an alicyclic olefin polymer, a chain olefin polymer such as polyethylene and polypropylene, triacetyl cellulose, polyvinyl alcohol, polyimide, polyarylate, polyester, polycarbonate, polysulfone, polyether sulfone, a modified acryl polymer, an epoxy resin, polystyrene, and an acrylic resin. Among these, from the viewpoint of availability, polyester such as polyethylene terephthalate is preferable.

Prior to the coating with the liquid crystal composition, the surface of the support body may be subjected to a treatment for imparting an orientation regulating force thereto. Examples of such a treatment may include a rubbing treatment of the surface of the support body and a stretching treatment of the film of the support body. A surface treatment for enhancing an affinity of the surface of the support body to the liquid crystal composition, such as a corona treatment, may also be performed.

Although the support body may have on its surface an orientation film, it is preferable not to have an orientation film. In that case, a treatment such as a rubbing treatment for imparting an orientation regulating force thereto is directly performed to the surface of a film formed with the aforementioned material, and then coating with the liquid crystal composition is performed. The material constituting the orientation film is usually a material which is more brittle than the aforementioned material of the film. Therefore, when a support body having an orientation film is used, an operation for imparting orientation regulating force thereto, such as rubbing, sometimes causes the orientation film to be shaved to generate minute particles, leading to occurrence of failure. Such occurrence of failure can be prevented if a method other than rubbing is employed as a method for imparting an orientation regulating force to the orientation film. However, when an orientation regulating force is imparted by a method other than rubbing, variation of the usable liquid crystal compound and orientation is greatly limited, and an operation becomes complicated. On the contrary, such inconvenience can be avoided by employing a support body which does not have an orientation film in the present invention.

The coating with the liquid crystal composition may be performed by a known coating method. Examples of the coating method may include an extrusion coating method, a direct gravure coating method, a reverse gravure coating method, a die coating method, and a bar coating method.

After the liquid crystal composition was applied thereonto to form the layer of the liquid crystal composition, an orientation treatment may be performed as necessary prior to a curing process. The orientation treatment may be performed by, for example, heating the layer of the liquid crystal composition at 50 to 150° C. for 0.5 to 10 minutes. By performing the orientation treatment, the liquid crystal compound in the liquid crystal composition can be favorably oriented.

A curing treatment of the layer of the liquid crystal composition may be performed by a combination of once or more of energy ray irradiation and a warming treatment. Specifically, the warming conditions may be, for example, a temperature of 40 to 200° C., preferably 50 to 200° C., and further preferably 50 to 140° C., and a time period of 1 second to 3 minutes, and preferably 5 to 120 seconds. Examples of energy rays may include UV light, visible light, and other electromagnetic waves. The energy ray irradiation may be performed by, for example, irradiation with light having a wavelength of 200 to 500 nm for 0.01 seconds to 3 minutes.

Here, by alternately repeating weak UV irradiation at 0.01 to 50 mJ/cm$^2$ and warming multiple times, there can be obtained a cholesteric resin layer in which the size of the pitch of the helical structure continuously changes to a large extent, and thereby has a wide reflection band. After the reflection band was expanded by the aforementioned weak UV irradiation and the like, irradiation with relatively strong UV light at 50 to 10,000 mJ/cm$^2$ may be performed. By such an irradiation, the liquid crystal compound can be completely polymerized to obtain the cholesteric resin layer. The aforementioned expansion of the reflection band and strong UV irradiation may be performed in an air. Alternatively, a part or an entirety of the process may be performed in an atmosphere in which the oxygen concentration is controlled (for example, under a nitrogen atmosphere).

When performing emboss processing to the surface of the cholesteric resin layer after the formation of the cholesteric resin layer, the liquid crystal compound may be kept at non-completely polymerized state at this point, and additional UV irradiation may be performed after the emboss processing was performed, to thereby completely polymerize the liquid crystal compound.

In the present invention, the process of coating another layer such as an orientation film with the cholesteric liquid crystal composition and curing the applied composition is not limited once, and may be repeated multiple times so that two or more cholesteric resin layers are formed. However, with the use of the liquid crystal composition such as the liquid crystal composition (X), there can be easily formed a cholesteric resin layer which contains a favorably oriented rod-like liquid crystal compound having a Δn of 0.18 or more and has a thickness of 5 μm or more, even by performing the coating with the cholesteric liquid crystal composition and the curing only once.

In the present invention, the thickness of the cholesteric resin layer is preferably 0.1 μm or more, and more preferably 1 μm or more, for obtaining sufficient reflectivity. The thickness of the cholesteric resin layer is preferably 20 μm or less, and more preferably 10 μm or less, for obtaining transparency of a film. When the display medium according to the present invention has two or more cholesteric resin layers, the thickness of the cholesteric resin layer refers to the total of the thicknesses of the layers. When it has one cholesteric resin layer, the thickness refers to the thickness thereof.

[4. Intermediate Layer]

As the cholesteric resin layered body according to the present invention includes the intermediate layer interposed between the substrate and the cholesteric resin layer, time-dependent change in color during the use of the cholesteric resin layered body can be reduced. Although not to be bound by a specific theory, the reason for the reduction of time-dependent change in color is considered as follows. In the cholesteric resin layer, a monomer component which is not polymerized sometimes exists. When the cholesteric resin layer is heated during the use of the cholesteric resin layered body, such a monomer component sometimes migrates in the layer, and is further transferred to another layer, to cause alteration of the concentration thereof. Such change may cause alteration of the pitch of the helical structure of the cholesteric resin layer, and that may cause shift of a reflection band center wavelength. Here, when the intermediate layer is interposed between the substrate and the cholesteric resin layer, such transfer of a monomer component can be suppressed. Consequently, time-dependent change in color during the use of the cholesteric resin layered body can be reduced.

As the material constituting the intermediate layer, there may be appropriately selected a material which is capable of being interposed between the substrate and the cholesteric resin layer and capable of bonding thereto. In a preferred aspect, the intermediate layer is the following (i) or (ii).

Intermediate layer (i): layer containing polyvinyl alcohol, a modified polyvinyl alcohol compound, or a mixture thereof.

Intermediate layer (ii): layer of a cured product of a material containing polyvinyl alcohol, a modified polyvinyl alcohol compound, or a mixture thereof, and a curing agent.

Especially, it is particularly preferable to employ as the intermediate layer a layer of a cured product of a material containing a modified polyvinyl alcohol compound and a curing agent, so that the change of a reflection band center wavelength due to heating becomes a specific value or less.

When polyvinyl alcohol is used as a material of the intermediate layer, common polyvinyl alcohol obtained by hydrolysis of polyvinyl acetate may be used as such polyvinyl alcohol. Therefore, the polyvinyl alcohol in the present application also encompasses a polyvinyl alcohol containing an acetoxy group (—OCOCH$_3$) obtained by such a production method.

When a modified polyvinyl alcohol compound is used as a material of the intermediate layer, examples of such a modified polyvinyl alcohol compound may include a modified polyvinyl alcohol compound obtained by substituting an —OH group of polyvinyl alcohol with a substituent. Examples of the substituent may include an acetoacetoxy group (—OCOCH$_2$COCH$_3$), a quaternary ammonium chloride group (—NR$_3$Cl, R is an alkyl group, the number of carbons in each R is independently preferably 1 to 5, more preferably 1 to 3, and further more preferably 1 to 2), a sodium sulfonate group (—$SO_3Z$, Z is alkali metal such as Na), an ethylene oxide group (—$(CH_2CH_2O)_x$—H, X is preferably 1 or more, and more preferably 1), and a combination thereof. The modified polyvinyl alcohol compound may be a compound wherein some of many —OH groups possessed by one molecule of polyvinyl alcohol are substituted, and may also be a compound wherein all of the —OH groups are substituted.

A particularly preferable example of the modified polyvinyl alcohol compound may include a modified polyvinyl alcohol compound in which some of the —OH groups of polyvinyl alcohol are substituted with acetoacetoxy groups. As such a modified polyvinyl alcohol compound, there may be used a commercially available product (for example, trade name "Gohsenx Z (trademark)" manufactured by The Nippon Synthetic Chemical Industry Co., Ltd.

When a curing agent is used as the material of the intermediate layer (ii), a material which is capable of further firmly curing the polyvinyl alcohol and/or the modified polyvinyl alcohol compound may be appropriately selected for use as such a curing agent. Examples of the curing agent may include a crosslinking agent which is capable of reacting with the polyvinyl alcohol and/or the modified polyvinyl alcohol compound to form a crosslinked structure. Examples of the crosslinking agent for the polyvinyl alcohol may include boric acid, as well as an alkoxy compound of metal such as titanium and zirconium. Examples of the crosslinking agent for the acetoacetoxy group-modified polyvinyl alcohol compound may include metal salts such as an amine compound, a methylol compound, and zirconium. As the crosslinking agent, there also may be used a commercially available product (for example, trade name "Safelink SPM-01" and "Safelink SPM-02" manufactured by The Nippon Synthetic Chemical Industry Co., Ltd., as a curing agent for the modified polyvinyl alcohol compound in which some of —OH groups of polyvinyl alcohol are substituted with acetoacetoxy groups). With the use of such a curing agent, the intermediate layer can be more firmly cured. As a result, heat resistance and moisture resistance of the obtained cholesteric resin layered body can be enhanced.

The intermediate layer may contain an optional material in addition to the aforementioned materials. Examples of the optional material may include a UV absorber, a coloring agent, and an antistatic agent. The ratio of these optional components in the intermediate layer may be appropriately adjusted within the range that does not excessively impair the effects of the present invention.

The thickness of the intermediate layer is preferably 0.01 µm or more, and more preferably 0.1 µm or more, and is preferably 100 µm or less, more preferably 10 m or less, and further more preferably 5 µm or less. When the thickness of the intermediate layer is equal to or more than the aforementioned lower limit, change in color of the cholesteric resin layer under a high temperature environment can be favorably suppressed. When the thickness of the intermediate layer is equal to or less than the aforementioned upper limit, cracking and break of the substrate or the cholesteric resin layer due to the difference in expansion among the layers under a high temperature environment can be favorably suppressed.

[5. Method for Producing Cholesteric Resin Layered Body/Forming Method of Intermediate Layer]

The cholesteric resin layered body according to the present invention may be preferably produced by forming the substrate and the cholesteric resin layer, and further forming the intermediate layer between the substrate and the cholesteric resin layer.

In a preferred aspect, the intermediate layer is an adhesive layer obtained by curing an adhesive agent. Therefore, the cholesteric resin layered body according to the present invention may be produced by bonding the substrate and the cholesteric resin layer with an adhesive agent. Specifically, the cholesteric resin layered body according to the present invention may be produced by stacking the substrate and the cholesteric resin layer via a layer of an adhesive agent, and curing the layer of the adhesive agent to form the intermediate layer.

When the intermediate layer is the intermediate layer (i), the following adhesive agent (i) may be used to form the intermediate layer. When the intermediate layer is the intermediate layer (ii), the following adhesive agent (i) may be used to form the intermediate layer.

Adhesive agent (i): material containing polyvinyl alcohol, a modified polyvinyl alcohol compound, or a mixture thereof.

Adhesive agent (ii): material containing polyvinyl alcohol, a modified polyvinyl alcohol compound, or a mixture thereof, and a curing agent.

Especially, it is particularly preferable to employ as the adhesive agent a material containing a modified polyvinyl alcohol compound and a curing agent, so that the change of a reflection band center wavelength due to heating becomes a specific value or less.

The adhesive agent may contain an optional component in addition to the aforementioned adhesive agent (i) or (ii). Specific examples of the component of the adhesive agent may include those that are the same as the aforementioned materials of the intermediate layer.

The adhesive agent may further contain a solvent. Such a solvent is not particularly limited, and a solvent suitable for dissolution of other components and use in the production process may be appropriately selected. When the adhesive agent contains polyvinyl alcohol, a modified polyvinyl alcohol compound, or a mixture thereof, water is preferably used as a solvent suitable for dissolution of the polyvinyl alcohol, the modified polyvinyl alcohol compound, or a mixture thereof.

The ratio of solid content (ratio of components other than the solvent) in the adhesive agent may be appropriately adjusted within the range suitable for dissolution of other components and use in the production process, and is preferably 0.1% by weight or more, and more preferably 1% by weight or more, and is preferably 10% by weight or less, and more preferably 7% by weight or less.

When the adhesive agent is the aforementioned adhesive agent (ii), the ratio of the curing agent relative to 100 parts by weight of the polyvinyl alcohol and/or the modified polyvinyl alcohol compound is preferably 1 part by weight or more, and more preferably 5 parts by weight or more, and is preferably 20 parts by weight or less, and more preferably 10 parts by weight or less. When the ratio of the curing agent falls within the aforementioned range, firm effect can be efficiently achieved.

Figure 2:
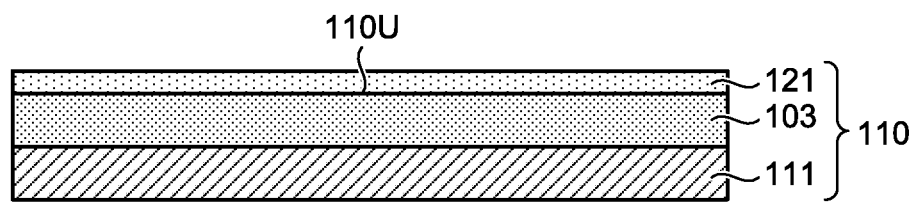
FIG. 2 is a cross-sectional view schematically illustrating a multi-layer product in a production process of the cholesteric resin layered body 100 illustrated in FIG. 1.
Figure 3:
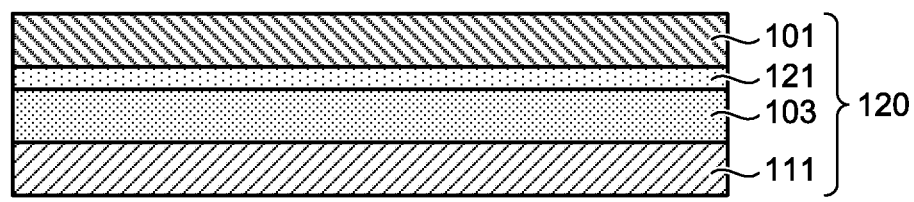
FIG. 3 is a cross-sectional view schematically illustrating a multi-layer product in the production process of the cholesteric resin layered body 100 illustrated in FIG. 1.
Figure 4:
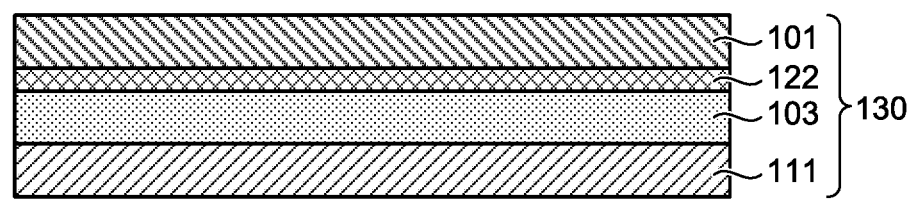
FIG. 4 is a cross-sectional view schematically illustrating a multi-layer product in the production process of the cholesteric resin layered body 100 illustrated in FIG. 1.

A specific example of the method for producing a cholesteric resin layered body 100 illustrated in FIG. 1 will be described with reference to FIG. 2 to FIG. 4. FIG. 2 to FIG. 4 are cross-sectional views schematically illustrating multi-layer products in a production process of the cholesteric resin layered body 100 illustrated in FIG. 1.

In this example, a multi-layer product 110 including a support body 111 and a cholesteric resin layer 103 formed on the support body 111 is firstly prepared. Subsequently, as illustrated in FIG. 2, an adhesive agent is applied onto a surface 110U of the multi-layer product 110 on the side of the cholesteric resin layer 103. Thus, an adhesive agent layer 121 in a liquid state is formed. Subsequently, as illustrated in FIG. 3, a substrate 101 is stacked on the adhesive agent layer 121 to obtain a multi-layer product 120 having a layer structure of (support body 111)/(cholesteric resin layer 103)/(adhesive agent layer 121)/(substrate 101). Subsequently, the multi-layer product 120 is subjected to a pressurization treatment by, for example, passing it through a laminator, as necessary. Thereafter, the adhesive agent layer 121 in a liquid state is cured to obtain a multi-layer product 130 having a layer structure of (support body 111)/(cholesteric resin layer 103)/(intermediate layer 122)/(substrate 101) as illustrated in FIG. 4. Furthermore, the support body 111 is peeled from the multi-layer product 130. Thus, the cholesteric resin layered body 100 illustrated in FIG. 1 can be obtained.

The conditions for curing the adhesive agent may be appropriately set so as to suit the used adhesive agent.

For example, when the adhesive agent (i) is used as the adhesive agent, the layered body containing the adhesive agent layer may be subjected to a drying treatment, so that a solvent in the adhesive agent is entirely or partly volatilized, to thereby cure the adhesive agent.

When the adhesive agent (ii) is used as the adhesive agent, a treatment may be performed under the conditions suitable for a reaction of the curing agent, so that the adhesive agent can be cured. When the reaction of the curing agent is promoted by heating, a drying treatment that is the same as that in a case of the adhesive agent (i) may be performed to promote the volatilization of a solvent and the reaction such as a crosslinking reaction, so that the adhesive agent can be cured. When a curing agent which proceeds with curing in response to the receipt of energy rays such as UV light is used as the curing agent, the curing of the adhesive agent may be achieved by irradiation with such energy rays. When a material containing the curing agent, such as the adhesive agent (ii), is used as the adhesive agent, properties, such as heat resistance and moisture resistance, of the obtained cholesteric resin layered body can be improved.

[6. Reflection Band Center Wavelength]

As to the cholesteric resin layered body according to the present invention, the difference in a reflection band center wavelength of the cholesteric resin layer before and after heating at 130° C. for 8 hours is 50 nm or less.

The reflection band center wavelength of the cholesteric resin layer may be obtained by measuring the spectral reflectivity of the cholesteric resin layer, and calculating the reflection band center wavelength on the basis of such a measurement result. The spectral reflectivity may be measured using a spectrophotometer (for example, product name "V-550" manufactured by JASCO Corporation). Usually, only the cholesteric resin layer has selective reflection characteristics in the cholesteric resin layered body. In that case, entirety of the layers of the cholesteric resin layered body may be measured for spectral reflectivity, and the spectral reflectivity of the cholesteric resin layer may be calculated on the basis of the measurement.

The spectral reflectivity is usually obtained as a graph in which the horizontal axis indicates a wavelength, and the reflectivity at the wavelength is plotted along the vertical axis. The reflection band of the cholesteric resin layer is usually indicated as a peak having a certain width in such a graph. The reflection band center wavelength $\lambda s$ may be calculated according to equation $\lambda s=(\lambda 1+\lambda 2)/2$ on the basis of a short wavelength-side wavelength $\lambda 1$ and a long wavelength-side wavelength $\lambda 2$ of two wavelengths indicating a reflectivity which is 30% of the maximum reflectivity Rmax in such a graph.

Figure 5:
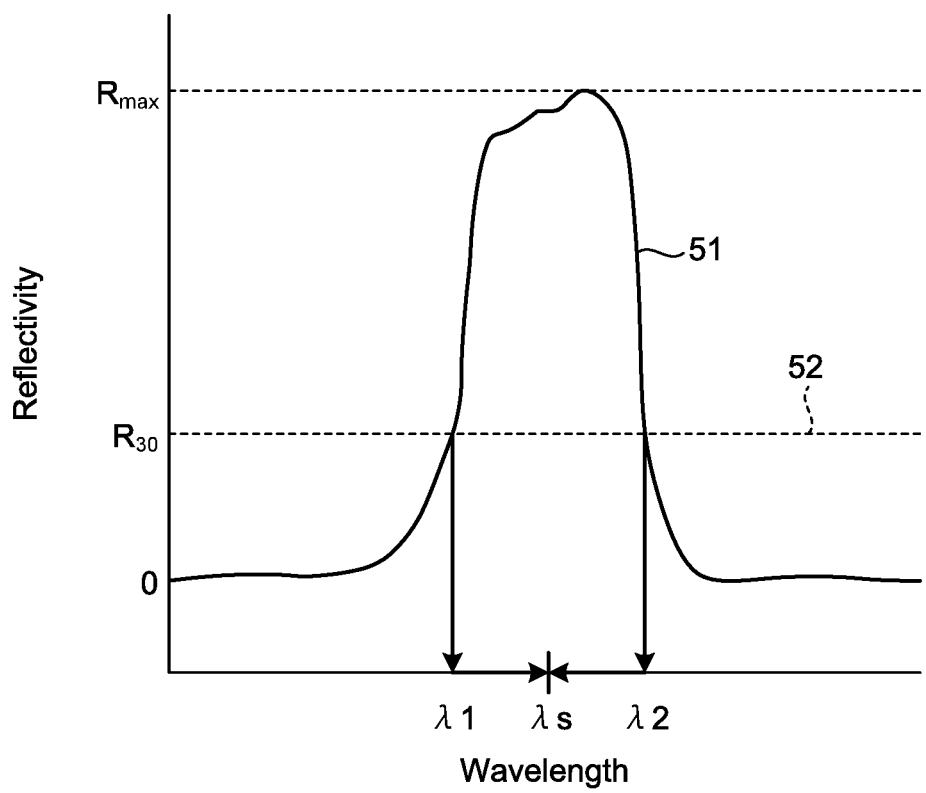
FIG. 5 is a graph schematically illustrating an example of the measurement result of spectral reflectivity of a cholesteric resin layer, and a calculation for obtaining a reflection band center wavelength on the basis of the measurement result.

FIG. 5 is a graph schematically illustrating an example of the measurement result of spectral reflectivity for a cholesteric resin layer, and a calculation for obtaining a reflection band center wavelength on the basis of the measurement result. In FIG. 5, the measurement result of spectral reflectivity is indicated by a curve 51. A reflectivity R30 which is 30% of a maximum value Rmax of spectral reflectivity becomes a level indicated by a line 52. The values on the horizontal axis of intersection points of the curve 51 and the line 52 become $\lambda 1$ and $\lambda 2$, and an average thereof becomes a reflection band center wavelength $\lambda s$.

Furthermore, the cholesteric resin layered body is heated at 130° C. for 8 hours, and a reflection band center wavelength $\lambda t$ after the heating is calculated in the same manner. The difference $\Delta\lambda st$ in a reflection band center wavelength before and after the heating may be calculated according to equation $\Delta\lambda st=|\lambda s-\lambda t|$.

The value of the difference $\Delta\lambda st$ is preferably 30 nm or less, and more preferably 10 nm or less. The lower limit of the value of the difference $\Delta\lambda st$ is not particularly limited, and ideally 0 nm.

Such a cholesteric resin layered body with which the difference in a reflection band center wavelength before and after heating is small may be obtained by appropriately selecting a material of the intermediate layer. Specifically, with the use of the aforementioned intermediate layer (i) or intermediate layer (ii), there can be obtained the cholesteric resin layered body in which the difference in a reflection band center wavelength before and after heating is small.

It is preferable that the cholesteric resin layered body has the circularly polarized light separation function in a wider wavelength band of visible light, when the layered body is used in applications such as display media and decorating materials. Specifically, the width of the reflection band indicated by $\lambda 2-\lambda 1$ before heating is preferably 50 nm or more.

[7. Use Applications of Cholesteric Resin Layered Body]

The use applications of the cholesteric resin layered body according to the present invention are not limited, and the cholesteric resin layered body may be used as a constituent of a product such as a reflective material, an anthenticity identification display medium, and a decorating material, taking advantage of optical properties and design characteristics such as color and gloss attributable to the optical properties. Among these, a reflective material, a display medium, and a decorating material will be described below, as the reflective material, the display medium, and the decorating material according to the present invention, respectively.

[7.1. Reflective Material]

The reflective material according to the present invention includes the cholesteric resin layered body according to the present invention. Specifically, the cholesteric resin layered body is cut to an appropriate size, and the cut piece itself may be used as the reflective material. In addition to this, the cholesteric resin layered body may be bonded to another member via an appropriate adhesive agent to constitute a reflective material. The use applications of the reflective material are not particularly limited. For example, a cholesteric resin layer having a reflection band in an infrared region or a UV region is formed, and the formed cholesteric resin layer may be used to produce an infrared reflective material or a UV reflective material. Since the reflective material according to the present invention includes the cholesteric resin layered body according to the present invention, it can be suitably used under a high temperature use environment.

[7.2. Display Medium]

The display medium according to the present invention includes the cholesteric resin layered body according to the present invention.

Examples of the display medium may include a medium disposed on the surface of an article for displaying information on the surface of the article. More specific examples may include an anti-counterfeit display medium and a security display medium which take advantage of the property of inhibiting easy duplication of the layered body containing the cholesteric resin layer. Examples of the anti-counterfeit display medium may include a label and a sticker for anthenticity identification. Examples of the security display medium may include authentication media such as a cash voucher, a gift certificate, a ticket, a certificate, and a security card.

Preferably, the display medium according to the present invention includes the cholesteric resin layered body in such a manner that viewed images differ depending on the manner of observing the images. A specific example thereof will be described with reference to FIG. 6 to FIG. 8.

Figure 6:
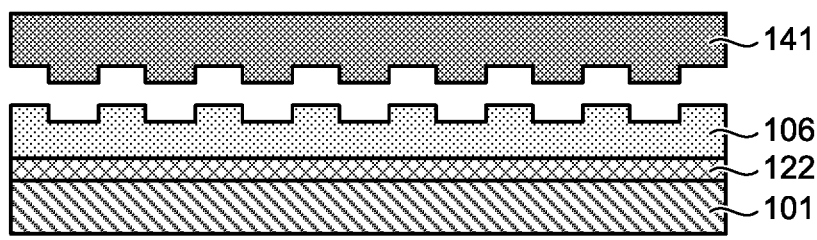
FIG. 6 is a cross-sectional view schematically illustrating a process of producing an example of a display medium according to the present invention with the cholesteric resin layered body illustrated in FIG. 1.
Figure 7:
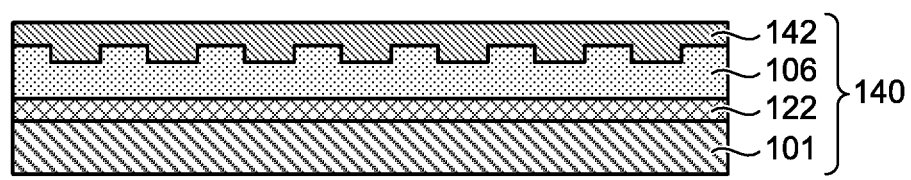
FIG. 7 is a cross-sectional view schematically illustrating a process of producing an example of the display medium according to the present invention with the cholesteric resin layered body illustrated in FIG. 1.

FIG. 6 to FIG. 7 are cross-sectional views schematically illustrating a process of producing an example of the display medium according to the present invention with the cholesteric resin layered body illustrated in FIG. 1. In this example, there is produced a display medium having a hologram emboss and a base image, wherein the manner of visually recognizing the hologram emboss and the base image differs depending on the manner of observing the display medium. First, an emboss mold 141 is pushed against the surface of the cholesteric resin layered body 100 illustrated in FIG. 1 on the side of the cholesteric resin layer 103 as illustrated in FIG. 6. Consequently, a concavo-convex shape is given to the surface of the cholesteric resin layer 103 to form a concavo-convex cholesteric resin layer 106. The specific shape of the concavo-convex shape is not particularly limited. By disposing a microscopic concavo-convex structure in which a concavo-convex shape functions as a diffraction grating when irradiated with light, a display medium capable of displaying a hologram image can be obtained.

Thereafter, unreacted monomers present in the concavo-convex cholesteric resin layer 106 are cured with UV irradiation and the like as necessary, so that the hardness is increased. Further thereafter, as illustrated in FIG. 7, a base image layer 142 is formed on the surface of the concavo-convex cholesteric resin layer 106. The base image layer may be formed by a known method such as printing. Accordingly, there may be formed a base image layer in which an image can be visually recognized when observed from the side of the substrate 101. Thus, there may be obtained a display medium 140 which includes the substrate 101, the intermediate layer 122, the concavo-convex cholesteric resin layer 106, and the base image layer 142 in this order. Furthermore, an optional layer such as an adhesive layer and an additional substrate layer may be formed on the surface of the display medium 140 on the side of the base image layer 142, and the display medium 140 may be disposed on the surface of an article via the formed optional layer.

Figure 8:
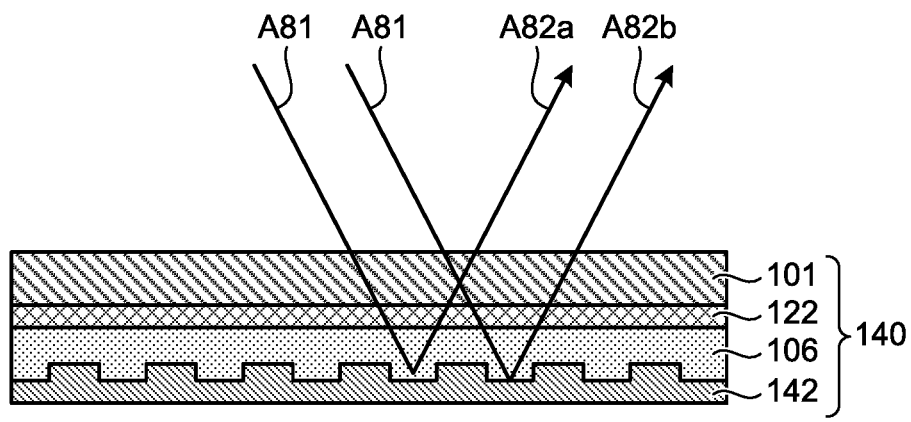
FIG. 8 is a cross-sectional view schematically illustrating an aspect of use of a display medium 140 obtained in the production process illustrated in FIG. 6 and FIG. 7.

FIG. 8 is a cross-sectional view schematically illustrating an aspect of use of the display medium 140 obtained in the production process illustrated in FIG. 6 and FIG. 7. In FIG. 8, when non-polarized light enters the surface of the display medium 140 on the side of the substrate 101 in a direction indicated by arrow A81, one of clockwise circularly polarized light and counterclockwise circularly polarized light is reflected in the concavo-convex cholesteric resin layer 106, and exits in a manner indicated by arrow A82a, in the reflection band of the concavo-convex cholesteric resin layer 106. On the other hand, the residual light is reflected on the surface of the base image layer 142, and exits in a manner indicated by arrow A82b. Therefore, for example, when the concavo-convex cholesteric resin layer 106 is a layer selectively reflecting clockwise circularly polarized light, an image formed by the hologram emboss is observed when the display medium 140 is observed through a filter which allows for transmission of only clockwise circularly polarized light, and an image of the base image is observed when the display medium 140 is observed through a filter which allows for transmission of only counterclockwise circularly polarized light. Therefore, when such a difference between the images is observed, the display medium may be judged as being an authentic display medium having the constituents of the present invention. When such a difference between the images is not observed, the display medium may be judged as being a non-authentic display medium which is produced by electronic printing or the like and does not have the structure of the display medium according to the present invention.

[7.3. Decorating Material]

The decorating material according to the present invention includes the cholesteric resin layered body according to the present invention. Specifically, the cholesteric resin layered body is cut to an appropriate size, and the cut piece itself may be used as the decorating material. In addition to this, the cholesteric resin layered body may be bonded to another member via an appropriate adhesive agent to constitute a decorating material. Examples of an article to be decorated with the decorating material according to the present invention may include ornamental articles, stationery, furniture, automobiles (interior and exterior), household appliances, personal computers, and cosmetic packages. Design effects attributable to the decorating material according to the present invention are not particularly limited, and may be any effects which take advantage of appearances possessed by the cholesteric resin layer. For example, since metallic gloss can be exerted without using metal, metallic design effects can be obtained even in an application where use of metal is not preferable. Similarly to the aforementioned display medium, a hologram emboss may be formed on the cholesteric resin layer to obtain design effects of hologram.

EXAMPLES

Hereinafter, the present invention will be specifically described by illustrating Examples. However, the present invention is not limited to the following Examples and may be optionally modified for implementation without departing from the scope of claims of the present invention and its equivalents.

In the following description, "%" and "parts", both indicating quantity, are on the basis of weight, unless otherwise stated.

The following operation was performed in a normal temperature and normal pressure in an atmospheric air, unless otherwise stated.

[Evaluation Method]
[Reflection Band Center Wavelength]

The spectral reflectivity of each of the cholesteric resin layered bodies prepared in Examples and Comparative Examples was performed using a spectrophotometer (product name "V-550" manufactured by JASCO Corporation). The reflection band center wavelength was calculated according to equation $\lambda s=(\lambda 1+\lambda 2)/2$ from a short wavelength-side wavelength $\lambda 1$ and a long wavelength-side wavelength $\lambda 2$ of two wavelengths indicating a reflectivity which is 30% of a maximum reflectivity Rmax in a graph of the obtained spectral reflectivity.

[Color and Change in Color of Cholesteric Resin Layer]

The color of the cholesteric resin layer was evaluated by visually observing the surface of the cholesteric resin layer from a normal line direction thereof under white fluorescent lighting.

Change in color due to a heating treatment was evaluated as "no change" when the change in color was not recognized before and after the heating treatment, "slight" when the color changed but the system of the color did not change, and "large" when the color changed otherwise.

Production Example 1: Cholesteric Resin Layer 1

Components were mixed at a formulation ratio shown in Table 1 to prepare a cholesteric liquid crystal composition.

Each of compounds (1) and (2) in Table 1 is a compound having the following structure. The compound (1) and the compound (2) to be used were produced according to the method described in International Publication No. WO 2009/041512, and the method described in Japanese Patent Application Laid-Open No. Hei. 11-100575, respectively.

Production Example 2: Cholesteric Resin Layer 2

A cholesteric resin layer 2 having a thickness of 1.0 µm was formed on a support body in the same manner as that of Production Example 1, except that the formulation ratio of the cholesteric liquid crystal composition was changed as shown in Table 1. Thus, there was obtained a multi-layer product 2 having a layer structure of (support body)/(cholesteric resin layer 2). The value of $\lambda 2-\lambda 1$ for the obtained multi-layer product 2 was 63 nm.

TABLE 1

|  |  | Prod. Ex. 1 | Prod. Ex. 2 |
| --- | --- | --- | --- |
| Polymerizable liquid crystal compound | Compound (1) | 9.2 | — |
|  | LC242 (manufactured by BASF) | — | 13.7 |
| Polymerizable non-liquid crystal compound | Compound (2) | 4.1 | — |
| Chiral agent | LC756 (manufactured by BASF) | 0.83 | 0.48 |
| Polymerization initiator | Irgacure 379EG (manufactured by BASF) | 0.4 | 0.4 |
| Surfactant | KH40(manufactured by Seimi Chemical) | 0.03 | 0.03 |
| Solvent | Cyclopentanone | 85.5 | 85.5 |

Example 1

As an adhesive agent for forming an intermediate layer, there was prepared an aqueous solution 1 including 5% by weight of polyvinyl alcohol and 95% by weight of water. As

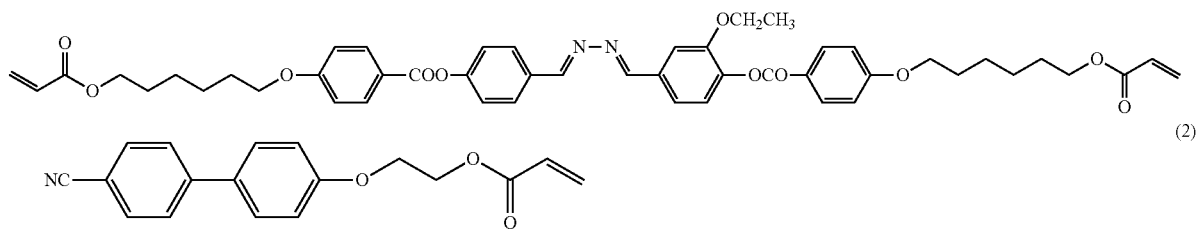

As a support body, a polyester film (Cosmoshine A4100 manufactured by Toyobo Co., Ltd., film thickness 100 µm, having on one side a surface having been subjected to an adhesion facilitating treatment) was prepared. The surface of this support body opposite to the surface having been subjected to an adhesion facilitating treatment was subjected to a rubbing treatment. Thereafter, the cholesteric liquid crystal composition was applied onto this surface using a #5 wire bar. Thus, a layer of the liquid crystal composition was formed. The layer was subjected to an orientation treatment at 100° C. for 5 minutes, and irradiated with UV light at 3000 mJ/cm$^2$ under a nitrogen atmosphere to form a cholesteric resin layer 1 having a thickness of 0.9 µm. Thus, there was obtained a multi-layer product 1 having a layer structure of (support body)/(cholesteric resin layer 1). The value of $\lambda 2-\lambda 1$ for the obtained multi-layer product 1 was 102 nm.

a substrate, there was also prepared a triacetyl cellulose film with a thickness of 40 µm having been subjected to a saponification treatment.

The adhesive agent was applied onto the surface of the multi-layer product 1 obtained in Production Example 1 on the side of the cholesteric resin layer 1, and the substrate was stacked on the applied adhesive agent to obtain a multi-layer product. This multi-layer product was pressurized by passing it through a laminator, and dried at 60° C. for 2 minutes. Accordingly, the layer of the adhesive agent was cured to obtain an intermediate layer. Thus, there was obtained a multi-layer product having a layer structure of (support body)/(cholesteric resin layer 1)/(intermediate layer)/(substrate).

Thereafter, the support body was peeled from this multi-layer product. Accordingly, there was obtained a cholesteric resin layered body 1 having a layer structure of (cholesteric resin layer 1)/(intermediate layer)/(substrate). The thickness of the intermediate layer was 0.9 µm.

The color of the cholesteric resin layer 1 of the obtained cholesteric resin layered body 1 was slightly reddish gold. The reflection band center wavelength of the cholesteric resin layer 1 was 619 nm.

Subsequently, this cholesteric resin layered body 1 was subjected to a heating treatment at 130° C. for 8 hours. Then, the color and the reflection band center wavelength of the cholesteric resin layer 1 were observed again. The color of the cholesteric resin layer 1 was gold, and the change in color due to the heating treatment was evaluated as "slight". The reflection band center wavelength was 591 nm.

Example 2

As an adhesive agent for forming an intermediate layer, there was prepared an aqueous solution 2 which includes 5% by weight of a modified polyvinyl alcohol compound (trade name "Gohsenx Z-200" manufactured by The Nippon Synthetic Chemical Industry Co., Ltd., obtained by substituting some of —OH groups of polyvinyl alcohol with acetoacetoxy groups) and 95% by weight of water. A cholesteric resin layered body 2 having a layer structure of (cholesteric resin layer 1)/(intermediate layer)/(substrate) was obtained in the same manner as that in Example 1, except that this aqueous solution 2 was used as an adhesive agent in place of the aqueous solution 1. The thickness of the intermediate layer was 1.0 µm.

The color of the cholesteric resin layer 1 of the obtained cholesteric resin layered body 2 was slightly reddish gold. The reflection band center wavelength of the cholesteric resin layer 1 was 620 nm.

Subsequently, this cholesteric resin layered body 2 was subjected to a heating treatment at 130° C. for 8 hours. Then, the color and the reflection band center wavelength of the cholesteric resin layer 1 were observed again. The color of the cholesteric resin layer 1 was gold, and the change in color due to the heating treatment was evaluated as "slight". The reflection band center wavelength was 602 nm.

Example 3

As an adhesive agent for forming an intermediate layer, there was prepared an aqueous solution 3 which includes 5% by weight of a modified polyvinyl alcohol compound (trade name "Gohsenx Z-200" manufactured by The Nippon Synthetic Chemical Industry Co., Ltd., obtained by substituting some of —OH groups of polyvinyl alcohol with acetoacetoxy groups), 4% by weight of a curing agent (trade name "Safelink SPM-01" manufactured by The Nippon Synthetic Chemical Industry Co., Ltd., 7% aqueous solution), and 91% by weight of water. A cholesteric resin layered body 3 having a layer structure of (cholesteric resin layer 1)/(intermediate layer)/(substrate) was obtained in the same manner as that in Example 1, except that this aqueous solution 3 was used as an adhesive agent in place of the aqueous solution 1. The thickness of the intermediate layer was 0.9 µm.

The color of the cholesteric resin layer 1 of the obtained cholesteric resin layered body 3 was slightly reddish gold. The reflection band center wavelength of the cholesteric resin layer 1 was 618 nm.

Subsequently, this cholesteric resin layered body 3 was subjected to a heating treatment at 130° C. for 8 hours. Then, the color and the reflection band center wavelength of the cholesteric resin layer 1 were observed again. The color of the cholesteric resin layer 1 was gold, and the change in color due to the heating treatment was evaluated as "no change". The reflection band center wavelength was 613 nm.

Example 4

A cholesteric resin layered body 4 having a layer structure of (cholesteric resin layer 2)/(intermediate layer)/(substrate) was obtained in the same manner as that in Example 3, except that the multi-layer product 2 obtained in Production Example 2 was used in place of the multi-layer product 1. The thickness of the intermediate layer was 1.1 µm.

The color of the cholesteric resin layer 2 of the obtained cholesteric resin layered body 4 was red. The reflection band center wavelength of the cholesteric resin layer 1 was 626 nm.

Subsequently, this cholesteric resin layered body 4 was subjected to a heating treatment at 130° C. for 8 hours. Then, the color and the reflection band center wavelength of the cholesteric resin layer 2 were observed again. The color of the cholesteric resin layer 2 was red, and the change in color due to the heating treatment was evaluated as "no change". The reflection band center wavelength was 619 nm.

Comparative Example 1

The multi-layer product 1 having a layer structure of (support body)/(cholesteric resin layer 1) obtained in Production Example 1 as it was evaluated in the same manner as that for the cholesteric resin layered bodies obtained in Examples 1 to 4. The color of the cholesteric resin layer 1 of the multi-layer product 1 was slightly reddish gold. The reflection band center wavelength of the cholesteric resin layer 1 was 617 nm.

Subsequently, this multi-layer product 1 was subjected to a heating treatment at 130° C. for 8 hours. Then, the color and the reflection band center wavelength of the cholesteric resin layer 1 were observed again. The color of the cholesteric resin layer 1 had been changed to green, and the change in color due to the heating treatment was evaluated as "large". The reflection band center wavelength was 536 nm.

Comparative Example 2

The multi-layer product 2 having a layer structure of (support body)/(cholesteric resin layer 2) obtained in Production Example 2 as it was evaluated in the same manner as that for the cholesteric resin layered bodies obtained in Examples 1 to 4. The color of the cholesteric resin layer 2 of the multi-layer product 2 was red. The reflection band center wavelength of the cholesteric resin layer 2 was 628 nm.

Subsequently, this multi-layer product 2 was subjected to a heating treatment at 130° C. for 8 hours. Then, the color and the reflection band center wavelength of the cholesteric resin layer 2 were observed again. The color of the cholesteric resin layer 1 had been changed to green, and the change in color due to the heating treatment was evaluated as "large". The reflection band center wavelength was 543 nm.

Comparative Example 3

As an adhesive agent for forming an intermediate layer, there was prepared an acrylate-based UV curable adhesive agent (Aronix LCR0634 manufactured by Toagosei Co., Ltd.). As a substrate, there was also prepared a triacetyl cellulose film with a thickness of 40 µm having been subjected to a saponification treatment, which was the same as that used in Example 1.

The adhesive agent was applied onto the surface of the multi-layer product 1 obtained in Production Example 1 on the side of the cholesteric resin layer 1, and the substrate was stacked on the applied adhesive agent to obtain a multi-layer product. This multi-layer product was pressurized by passing it through a laminator, and irradiation with UV light at 3000 mJ/cm$^2$ was performed on the side of the substrate. Thus, the adhesive agent was cured.

Thereafter, the support body was peeled from this multi-layer product. Accordingly, there was obtained a cholesteric resin layered body 5 having a layer structure of (cholesteric resin layer 1)/(intermediate layer)/(substrate). The thickness of the intermediate layer was 3.6 µm.

The color of the cholesteric resin layer 1 of the obtained cholesteric resin layered body 5 was slightly reddish gold. The reflection band center wavelength of the cholesteric resin layer 1 was 619 nm.

Subsequently, this cholesteric resin layered body 5 was subjected to a heating treatment at 130° C. for 8 hours. Then, the color and the reflection band center wavelength of the cholesteric resin layer 1 were observed again. The color of the cholesteric resin layer 1 had been changed to green, and the change in color due to the heating treatment was evaluated as "large". The reflection band center wavelength was 534 nm.

Comparative Example 4

A cholesteric resin layered body 6 having a layer structure of (cholesteric resin layer 2)/(intermediate layer)/(substrate) was obtained in the same manner as that in Comparative Example 3, except that the multi-layer product 2 obtained in Production Example 2 was used in place of the multi-layer product 1. The thickness of the intermediate layer was 3.8 µm.

The color of the cholesteric resin layer 2 of the obtained cholesteric layered body 6 was red. The reflection band center wavelength of the cholesteric resin layer 1 was 629 nm.

Subsequently, this cholesteric resin layered body 6 was subjected to a heating treatment at 130° C. for 8 hours. Then, the color and the reflection band center wavelength of the cholesteric resin layer 2 were observed again. The color of the cholesteric resin layer 2 had been changed to green, and the change in color due to the heating treatment was evaluated as "large". The reflection band center wavelength was 539 nm.

Comparative Example 5

As an adhesive agent for forming an intermediate layer, there was prepared a two-part epoxy-based adhesive agent (manufactured by Cemedine Co., Ltd., No. 1500, including a base compound and a curing agent). As a substrate, there was also prepared a triacetyl cellulose film with a thickness of 40 µm having been subjected to a saponification treatment which was the same as that used in Example 1.

The adhesive agent, which had been prepared by mixing the same amounts of the base compound and the curing agent, was applied onto the surface of the multi-layer product 1 obtained in Production Example 1 on the side of the cholesteric resin layer 1, and the substrate was stacked on the applied adhesive agent to obtain a multi-layer product. This multi-layer product was pressurized by passing it through a laminator, and subjected to a heating treatment at 40° C. for 10 hours. Thus, the adhesive agent was cured.

Thereafter, the support body was peeled from this multi-layer product. Accordingly, there was obtained a cholesteric resin layered body 7 having a layer structure of (cholesteric resin layer 1)/(intermediate layer)/(substrate). The thickness of the intermediate layer was approximately 10 µm.

The color of the cholesteric resin layer 1 of the obtained cholesteric layered body 7 was slightly reddish gold. The reflection band center wavelength of the cholesteric resin layer 1 was 618 nm.

Subsequently, this cholesteric resin layered body 7 was subjected to a heating treatment at 130° C. for 8 hours. Then, the color and the reflection band center wavelength of the cholesteric resin layer 1 were observed again. The color of the cholesteric resin layer 1 had been changed to green, and the change in color due to the heating treatment was evaluated as "large". The reflection band center wavelength was 552 nm.

The results of Examples and Comparative Examples are collectively shown in Table 2 and Table 3.

TABLE 2

|  | Ex. 1 | Ex. 2 | Ex. 3 | Ex. 4 |
| --- | --- | --- | --- | --- |
| Substrate | Triacetyl cellulose resin | Triacetyl cellulose resin | Triacetyl cellulose resin | Triacetyl cellulose resin |
| Cholesteric resin layer | Cholesteric resin layer 1 | Cholesteric resin layer 1 | Cholesteric resin layer 1 | Cholesteric resin layer 2 |
| Intermediate layer | PVA | Modified PVA | Modified PVA + Curing agent | Modified PVA + Curing agent |
| Reflection band center wavelength (nm) initial | 619 | 620 | 618 | 626 |
| Reflection band center wavelength (nm) after heating treatment | 591 | 602 | 613 | 619 |
| Reflection band center wavelength (nm) changing amount | −28 | −18 | −5 | −7 |
| Color change by heating treatment | Slight | Slight | No chage | No change |

TABLE 3

|  | Comp. Ex. 1 | Comp. Ex. 2 | Comp. Ex. 3 | Comp. Ex. 4 | Comp. Ex. 5 |
| --- | --- | --- | --- | --- | --- |
| Substrate | Polyester resin | Polyester resin | Triacetyl cellulose resin | Triacetyl cellulose resin | Triacetyl cellulose resin |

TABLE 3-continued

| | Comp. Ex. 1 | Comp. Ex. 2 | Comp. Ex. 3 | Comp. Ex. 4 | Comp. Ex. 5 |
|---|---|---|---|---|---|
| Cholesteric resin layer | Cholesteric resin layer 1 | Cholesteric resin layer 2 | Cholesteric resin layer 1 | Cholesteric resin layer 2 | Cholesteric resin layer 1 |
| Intermediate layer | None | None | Acrylate cured product | Acrylate cured product | Epoxy cured product |
| Reflection band center wavelength (nm) initial | 617 | 628 | 619 | 629 | 618 |
| Reflection band center wavelength (nm) after heating treatment | 536 | 543 | 534 | 539 | 552 |
| Reflection band center wavelength (nm) changing amount | −81 | −85 | −85 | −90 | −66 |
| Color change by heating treatment | Large | Large | Large | Large | Large |

As apparent from the results in Table 2 and Table 3, in Examples 1 to 4 in which the material of the intermediate layer is appropriately selected and the requirements of the present invention are satisfied, the change in color due to the heating treatment is small, and the time-dependent change in color due to the heating treatment is smaller than in the Comparative Examples. Therefore, it is apparent that the cholesteric resin layered bodies in which the time-dependent change in color during use is small were successfully obtained.

REFERENCE SIGN LIST

51: curve of measurement result of spectral reflectivity
52: line of level of reflectivity R30
100: cholesteric resin layered body
101: substrate
103: cholesteric resin layer
106: concavo-convex cholesteric resin layer
110: multi-layer product
110U: surface of multilayer product on side of cholesteric resin layer
111: support body
120: multi-layer product
121: layer of adhesive agent
122: intermediate layer
130: multi-layer product
140: display medium
141: emboss mold
142: base image layer

The invention claimed is:

1. A cholesteric resin layered body comprising a substrate, an intermediate layer, and a cholesteric resin layer in this order, wherein
the intermediate layer is a layer of a cured product of a material containing a modified polyvinyl alcohol compound and a curing agent,
a ratio of the curing agent relative to 100 parts by weight of the modified polyvinyl alcohol compound is 5 parts by weight or more and 20 parts by weight or less, and
a difference in a reflection band center wavelength of the cholesteric resin layer before and after the layered body is heated at 130° C. for 8 hours is 50 nm or less.

2. The cholesteric resin layered body according to claim 1, wherein the cholesteric resin layer reflects light of a band that is a part or an entirety of a visible light wavelength region.

3. The cholesteric resin layered body according to claim 1, wherein the cholesteric resin layer is a layer of a compound having a crosslinked structure.

4. The cholesteric resin layered body according to claim 1, wherein the cholesteric resin layer is formed from a liquid crystal composition containing a compound represented by formula (2):

$$R^3\text{—}C^3\text{-}D^3\text{-}C^5\text{-}M\text{-}C^6\text{-}D^4\text{-}C^4\text{—}R^4 \qquad \text{formula (2)},$$

in the formula (2),
$R^3$ and $R^4$ each independently represent a group selected from the group consisting of a (meth)acryl group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group,
$D^3$ and $D^4$ each independently represent a group selected from the group consisting of a single bond, a linear or branched alkyl group of 1 to 20 carbon atoms, and a linear or branched alkylene oxide group of 1 to 20 carbon atoms,
$C^3$ to $C^6$ each independently represent a group selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—,
M represents a group in which two to four skeletons being the same as or different from each other are linked via a linking group, the skeleton being selected from the group consisting of azomethines, azoxys, phenyls, biphenyls, terphenyls, naphthalenes, anthracenes, benzoic acid esters, cyclohexanecarboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexyl benzonitriles which are unsubstituted or may have a substituent, and the linking group being selected from the group consisting of —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—, the substituent that M may have is a halogen atom, an alkyl group of 1 to 10 carbon atoms that may have a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, or —O—C(=O)—NR$^5$R$^7$, wherein R$^5$ and R$^7$ represent a hydrogen atom or an alkyl group of 1 to 10 carbon atoms, wherein when R$^5$ and R$^7$ are an alkyl group, —O—, —S—, —O—C(=O)—, —C(=O)—O—, —O—C(=O)—O—, or —C(=O)— may be interposed in the alkyl group (with a proviso that cases where two or more adjacent —O-'s and two or more adjacent —S-'s are interposed are excluded), wherein R$^6$ represents a hydrogen atom or an alkyl group of 1 to 6 carbon atoms, and the substituent in the alkyl group of 1 to 10 carbon atoms that may have a substituent is a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, or an alkoxycarbonyloxy group of 2 to 7 carbon atoms.

5. The cholesteric resin layered body according to claim 1, wherein the substrate is a film of an acetyl cellulose resin or a cycloolefin resin.

6. The cholesteric resin layered body according to claim 1, wherein the intermediate layer is an adhesive layer obtained by curing an adhesive agent, and the substrate and the cholesteric resin layer are bonded via the adhesive layer.

7. A method for producing the cholesteric resin layered body according to claim 1, comprising:
stacking the substrate and the cholesteric resin layer via a layer of an adhesive agent; and
curing the layer of the adhesive agent to form the intermediate layer, wherein
the adhesive agent is a material containing a modified polyvinyl alcohol compound and a curing agent, and
a ratio of the curing agent relative to 100 parts by weight of the modified polyvinyl alcohol compound is 5 parts by weight or more and 20 parts by weight or less.

8. A reflective material comprising the cholesteric resin layered body according to claim 1.

9. A display medium comprising the cholesteric resin layered body according to claim 1.

10. A decorating material comprising the cholesteric resin layered body according to claim 1.

11. The cholesteric resin layered body according to claim 1, wherein a thickness of the intermediate layer is 0.9 μm or more and 100 μm or less.

12. The cholesteric resin layered body according to claim 1, wherein a total light transmittance of the substrate is 70% or more.

13. The production method according to claim 7, wherein the cholesteric resin layer is formed from a liquid crystal composition containing a compound represented by formula (2):

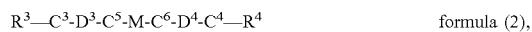

in the formula (2),

R$^3$ and R$^4$ each independently represent a group selected from the group consisting of a (meth)acryl group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group, D$^3$ and D$^4$ each independently represent a group selected from the group consisting of a single bond, a linear or branched alkyl group of 1 to 20 carbon atoms, and a linear or branched alkylene oxide group of 1 to 20 carbon atoms, C$^3$ to C$^6$ each independently represent a group selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, and —CH$_2$O—(C=O)—, M represents a group in which two to four skeletons being the same as or different from each other are linked via a linking group, the skeleton being selected from the group consisting of azomethines, azoxys, phenyls, biphenyls, terphenyls, naphthalenes, anthracenes, benzoic acid esters, cyclohexanecarboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexyl benzonitriles which are unsubstituted or may have a substituent, and the linking group being selected from the group consisting of —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—, the substituent that M may have is a halogen atom, an alkyl group of 1 to 10 carbon atoms that may have a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, or —O—C(=O)—NR$^5$R$^7$, wherein R$^5$ and R$^7$ represent a hydrogen atom or an alkyl group of 1 to 10 carbon atoms, wherein when R$^5$ and R$^7$ are an alkyl group, —O—, —S—, —O—C(=O)—, —C(=O)—O—, —O—C(=O)—O—, or —C(=O)— may be interposed in the alkyl group with a proviso that cases where two or more adjacent —O-'s and two or more adjacent —S-'s are interposed are excluded, wherein R$^6$ represents a hydrogen atom or an alkyl group of 1 to 6 carbon atoms, and the substituent in the alkyl group of 1 to 10 carbon atoms that may have a substituent is a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, or an alkoxycarbonyloxy group of 2 to 7 carbon atoms.

14. The production method according to claim 7, wherein a thickness of the intermediate layer is 0.9 μm or more and 100 μm or less.

15. The production method according to claim 7, wherein a total light transmittance of the substrate is 70% or more.

* * * * *